US006409871B1

(12) United States Patent
Washburn et al.

(10) Patent No.: US 6,409,871 B1
(45) Date of Patent: Jun. 25, 2002

(54) METHOD OF MAKING A BUSINESS FORM INCLUDING A LABEL

(75) Inventors: David E. Washburn; Hugh B. Skees, both of Dayton; Bryce Waggoner, Monroe, all of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/514,681

(22) Filed: Feb. 28, 2000

Related U.S. Application Data

(62) Division of application No. 09/003,652, filed on Jan. 7, 1998, now Pat. No. 6,053,535.

(60) Provisional application No. 60/034,912, filed on Jan. 7, 1997.

(51) Int. Cl.[7] .......... B32B 31/00

(52) U.S. Cl. .......... 156/256; 156/298; 156/300; 40/360; 40/626; 40/630; 40/675; 428/40.1; 428/41.7; 283/81; 283/69; 283/94; 283/98; 283/101; 283/109; 283/110

(58) Field of Search .......... 283/61, 62, 81, 283/10, 70, 94, 98, 100, 101, 110, 109, 69; 156/256, 298, 300, 293; 40/360, 626, 630, 675; 428/40.1, 41.7

(56) References Cited

U.S. PATENT DOCUMENTS

| | | | |
|---|---|---|---|
| 2,240,072 | A | 4/1941 | Hodgdon et al. |
| 2,783,172 | A | 2/1957 | Avery |
| 3,664,910 | A | 5/1972 | Hollie |
| 4,082,873 | A | 4/1978 | Williams |
| 4,180,929 | A | 1/1980 | Schultz, Jr. |
| 4,208,235 | A | 6/1980 | Stewart |
| 4,379,573 | A | 4/1983 | Lomeli et al. |
| 4,747,619 | A | 5/1988 | Sager |
| 4,837,088 | A | 6/1989 | Freedman |
| 4,854,610 | A | 8/1989 | Kwiatek |
| 4,863,772 | A | 9/1989 | Cross |
| 4,915,995 | A | 4/1990 | Smolen |
| 4,940,690 | A | 7/1990 | Skees |
| 4,941,196 | A | 7/1990 | Edelman et al. |
| 5,011,559 | A | 4/1991 | Felix |
| 5,098,759 | A | 3/1992 | Felix |
| 5,129,682 | A | 7/1992 | Ashby |
| 5,149,571 | A | 9/1992 | Croell |

(List continued on next page.)

*Primary Examiner*—Linda Gray
(74) *Attorney, Agent, or Firm*—Killworth, Gottman, Hagan & Schaeff LLP

(57) ABSTRACT

A business form includes a carrier sheet having an upper surface and a lower surface, and defining a die cut opening there through, with a patch of liner material mounted on the lower surface of the carrier sheet. The patch extends over the opening. The liner material has an upper surface facing the die cut opening in the carrier sheet, and carries a release coating on the upper surface. A two ply label assembly is mounted on the patch of liner material in the die cut opening. The two ply label assembly includes a transparent ply mounted on the upper surface of the patch of liner material, and a label ply mounted on the transparent ply. The form is manufactured by: a.) die cutting an opening in a piece of carrier material; b.) adhesively affixing a patch of liner material to the piece of carrier material; c.) mounting a transparent ply on the patch of liner material within the die cut opening; and d.) mounting a label ply on the transparent ply. The form is used by: a.) removing the label ply from the transparent ply; b.) adhesively securing the label ply to the label support surface; c.) removing the transparent ply from the patch of liner material; and d.) adhesively securing the transparent ply to the label ply and to the label support surface, such that the transparent ply completely covers the label ply, thereby protecting the label ply while permitting the indicia to be viewed.

4 Claims, 2 Drawing Sheets

U.S. PATENT DOCUMENTS

| | | | | | |
|---|---|---|---|---|---|
| 5,153,042 | A | | 10/1992 | Indrelie | |
| 5,217,259 | A | | 6/1993 | Wilen | |
| 5,271,787 | A | | 12/1993 | Hoffmann et al. | |
| 5,279,875 | A | | 1/1994 | Juszak et al. | |
| 5,318,326 | A | | 6/1994 | Garrison | |
| 5,320,387 | A | | 6/1994 | Carlson | |
| D352,310 | S | | 11/1994 | Edwards | |
| 5,389,415 | A | | 2/1995 | Kauffman | |
| 5,403,236 | A | | 4/1995 | Greig | |
| 5,405,692 | A | | 4/1995 | Weng et al. | |
| 5,410,136 | A | | 4/1995 | McIntire et al. | |
| 5,413,830 | A | | 5/1995 | Edwards | |
| 5,494,726 | A | | 2/1996 | Inomata | |
| 5,498,455 | A | | 3/1996 | Roberts | |
| 5,509,992 | A | | 4/1996 | Axelrod | |
| 5,510,171 | A | | 4/1996 | Favkish | |
| 5,522,956 | A | * | 6/1996 | McCannel | 156/209 |
| 5,595,404 | A | | 1/1997 | Skees | |
| 5,773,111 | A | | 6/1998 | Brewster | |
| 5,782,497 | A | | 7/1998 | Casagrande | |
| 5,874,143 | A | | 2/1999 | Peloqin et al. | |
| 5,876,816 | A | | 3/1999 | Freedman | |

* cited by examiner

METHOD OF MAKING A BUSINESS FORM INCLUDING A LABEL

CROSS REFERENCE TO RELATED APPLICATIONS

This application is a division of U.S. patent application Ser. No. 09/003,652, filed Jan. 7, 1998 now U.S. Pat. No. 6,053,535.

The present application claims the benefit of prior copending provisional application No. 60/034,912, filed Jan. 7, 1997.

BACKGROUND OF THE INVENTION

Labels have been developed in the past of the type which are mounted on a surface with pressure sensitive adhesive, and which are designed to resist abrasion and exposure to weather. Such a label may include a protective, transparent laminating ply mounted over the label ply carrying printed information. Labels of this type may, for example, advantageously be employed as validation labels for use on automobile licenses, and in other applications where harsh environmental conditions are encountered. One example of such a label construction is shown in U.S. Pat. No. 2,783,172, issued Feb. 26, 1957, to Avery. The Avery patent discloses a laminated label structure in which each label consists of an intermediate layer of acetate or similar transparent material with a pressure sensitive adhesive on its lower surface, mounted on a backing sheet. The label structure of the Avery patent further includes a label layer having a pressure sensitive adhesive on its lower surface, mounted on the intermediate layer. In use, information is initially printed on the label layer of the Avery patent. The label layer is then removed and applied to a surface. Finally, the intermediate layer is removed from the backing sheet and applied over the label layer.

The labels disclosed in the Avery patent are provided on backing sheets carrying a plurality of such labels; they are not included on business forms. Further, if such a multiple ply label were to be mounted on a business form, the label surface would be raised significantly above the surface of the business form. It will be appreciated that this could result in a business form that would not be easily printed by some types of printers, such as for example laser printers.

The method by which the labels of the Avery patent are constructed has certain drawbacks, as well. Specifically, in the Avery patent, a removable backing sheet, a transparent acetate sheet and the label paper are fed in continuous sheet form into a label making press. Adhesives are applied to the undersides of the acetate sheet and label paper, and the three sheets are led under a pressure roller. The resulting laminated sheet is then fed to die cut rollers where the label sheet and the acetate sheet are cut. The cuts made in the label sheet are made against the backing of the acetate sheet, which may not be as hard as is desired for a clean cut. The matrix material between the labels thus formed is then stripped away. The labels in the Avery patent may then be printed, or printed at a later time. It will be appreciated that any scrap created during the press make ready operation will include the transparent acetate material as well as the label material, thus increasing the cost of such scrap.

Other desirable label innovations include tamper evident features wherein a laminate structure includes an opaque layer which upon de-lamination preferentially separates so that a warning word, such as "VOID" is displayed on the label, on the surface from which it was removed, or on both surfaces. Commercial products which provide label manufacturers with the components needed to manufacture tamper evident labels have been available. Examples of such materials include: SCOTCH™ Protected Graphics Systems and SECURMARK™, both available from Minnesota Mining and Manufacturing Company, St. Paul, Minn., and TAMPERmark™, available from FLEXcon Company, Inc., Spencer, Mass.

There is a need for a business form that includes a label that provides protection from environmental conditions, that is easily manufactured, that provides tamper evident features, and that is simple and effective in use.

SUMMARY OF THE INVENTION

A business form including a label assembly according to the present invention meets these needs. The business form includes a carrier sheet having an upper surface and a lower surface, and defining a die cut opening there through. A patch of liner material is mounted on the lower surface of the carrier sheet, and extends over the opening. The patch of liner material has an upper surface facing the die cut opening in the carrier sheet, and carrying a release coating on the upper surface. A two ply label assembly is mounted on the patch of liner material in the die cut opening. The two ply label assembly includes a transparent ply mounted on the upper surface of the patch of liner material, and a label ply mounted on the transparent ply.

The transparent ply has an upper surface and a lower surface, and a layer of pressure sensitive adhesive coats at least a portion of the lower surface of the transparent ply, adhesively securing the transparent ply to the patch of liner material. A release coating extends over at least a portion of the upper surface of the transparent ply. The label ply has an upper surface and a lower surface, and a layer of pressure sensitive adhesive coats at least a portion of the lower surface of the label ply, adhesively securing the label ply to the transparent ply. The label ply includes a layer of tamper evident material on the lower surface, whereby the removal of the label ply from a surface not coated with a release coating causes such removal to become evident. The label ply has an upper surface and a lower surface, and the label ply carries printed indicia on its upper surface. The patch of liner material is larger than the die cut opening, and the patch of liner material is mounted on the lower surface of the carrier sheet by an adhesive coating that extends around the periphery of the patch of liner material.

These needs are further met by a method of making a business form according to the present invention. This method contemplates the manufacture of a carrier sheet having an upper surface and a lower surface, and defining a die cut opening there through. A patch of liner material is mounted on the lower surface of the carrier sheet, and extends over the opening. The liner material has an upper surface facing the die cut opening in the carrier sheet, and carries a release coating on the upper surface. A two ply label assembly, mounted on the patch of liner material in the die cut opening, includes a transparent ply mounted on the upper surface of the patch of liner material, and a label ply mounted on the transparent ply. The method comprises the steps of a.) die cutting an opening in a piece of carrier material; b.) adhesively affixing a patch of liner material to the piece of carrier material, c.) mounting a transparent ply on the patch of liner material within the die cut opening, and d.) mounting a label ply on the transparent ply.

The step of mounting a transparent ply on the patch of liner material within the die cut opening may include the step of adhesively mounting the transparent ply on the patch of liner material within the die cut. The step of mounting a label ply on the transparent ply may include the step of adhesively mounting the label ply on the transparent ply. The method may further include the step of separating a portion of the carrier material including the die cut opening from the balance of the piece of carrier material to form a carrier sheet.

The label ply has an upper surface and a lower surface, and the step of mounting the label ply on the transparent ply may include the step of mounting the label ply with the lower surface in contact with the transparent ply. The method may further comprise the step of printing indicia on the upper surface of the label ply prior to mounting the label ply on the transparent ply. The step of adhesively mounting the label ply on the transparent ply may include the step of mounting the label ply on the transparent ply with a tamper evident layer there between. The step of adhesively mounting the label ply on the transparent ply may include the step of including a release coating over that portion of the transparent ply upon which the label ply is mounted.

These needs are further met by a method according to the present invention of using a business form to apply a label assembly to a label support surface. The business form includes a carrier sheet having an upper surface and a lower surface, and defining a die cut opening there through. A patch of liner material is mounted on the lower surface of the carrier sheet, and extends over the opening. The liner material has an upper surface facing the die cut opening in the carrier sheet, and carrying a release coating on the upper surface. A two ply label assembly, mounted on the patch of liner material in the die cut opening, includes a transparent ply adhesively mounted on the upper surface of the patch of liner material, and a label ply bearing indicia on its upper surface adhesively mounted on the transparent ply. The method comprises the steps of removing the label ply from the transparent ply, adhesively securing the label ply to the label support surface, removing the transparent ply from the patch of liner material, and adhesively securing the transparent ply to the label ply and to the label support surface, such that the transparent ply completely covers the label ply, thereby protecting the label ply while permitting the indicia to be viewed.

Accordingly, it is an object of the present invention to provide a business form that includes a two ply label assembly including a label ply and a transparent ply; to provide such a business form in which the label ply and the transparent ply may be removed from the business form and secured to the label support surface with the transparent ply positioned over the label ply; to provide a method of making such a business form; and to provide a method of using such a business form.

Other objects and advantages of the invention will be apparent from the following detailed description, the accompanying drawings, and the appended claims.

DETAILED DESCRIPTION OF THE PREFERRED EMBODIMENT

Figure 1:
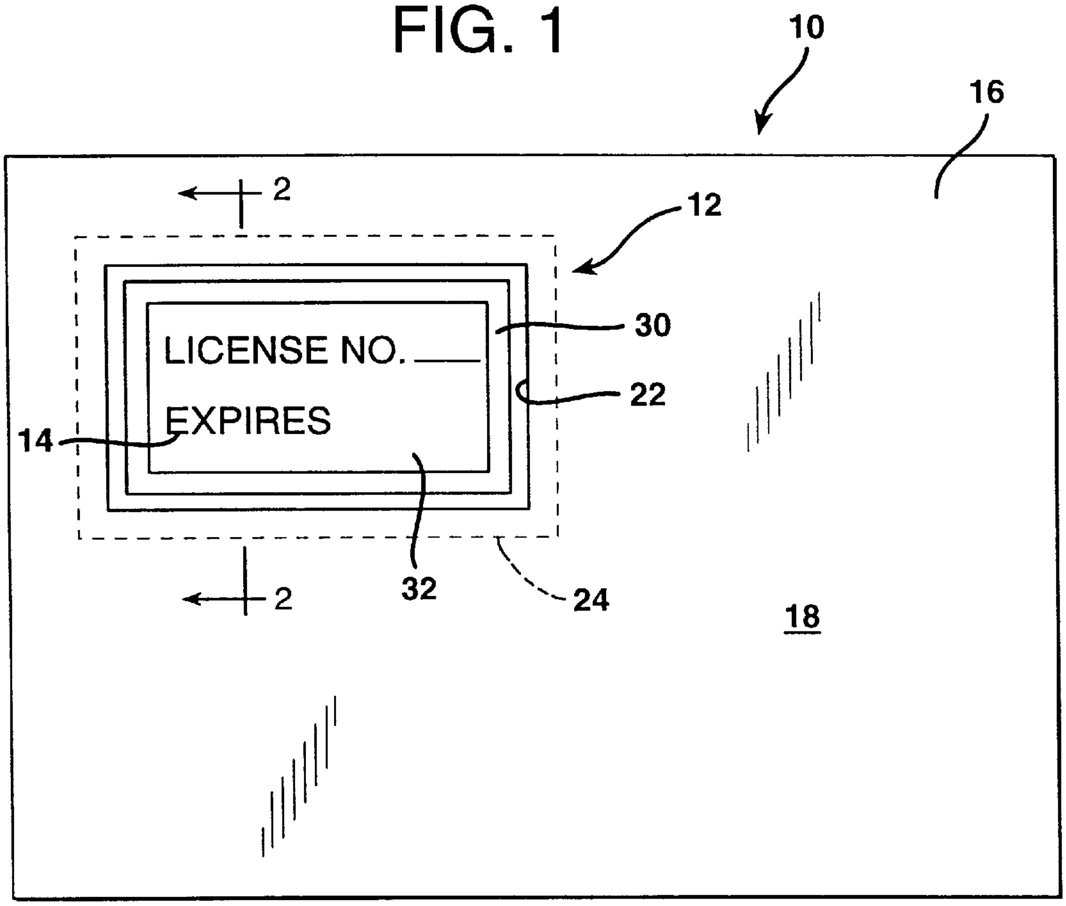
FIG. 1 is a plan view of the business form of the present invention.
Figure 2:
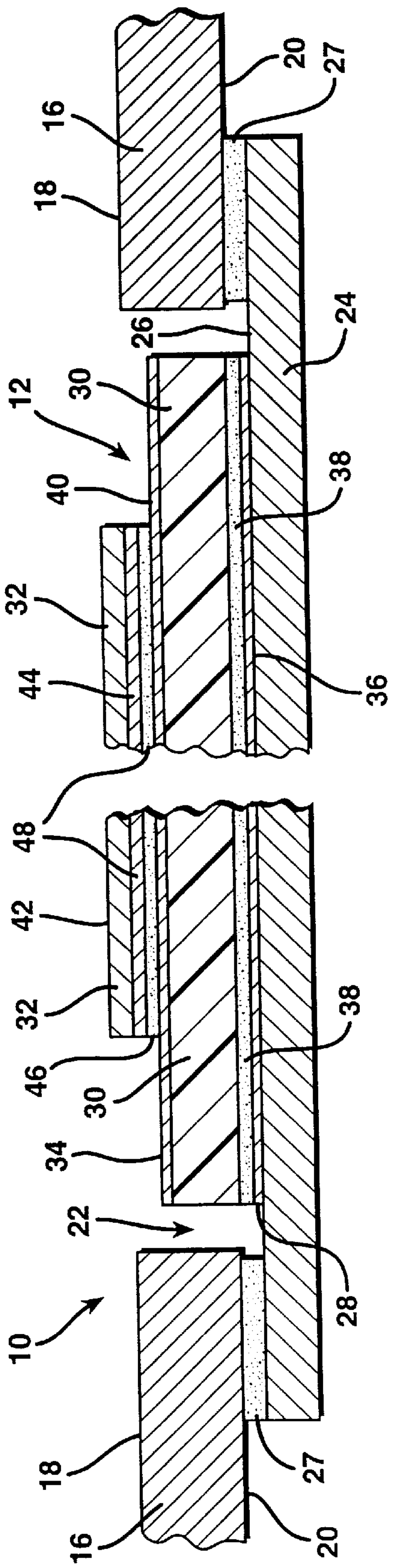
FIG. 2 is a sectional view of the business form of FIG. 1, taken generally along line 2—2, with portions broken away for simplicity.
Figure 3:
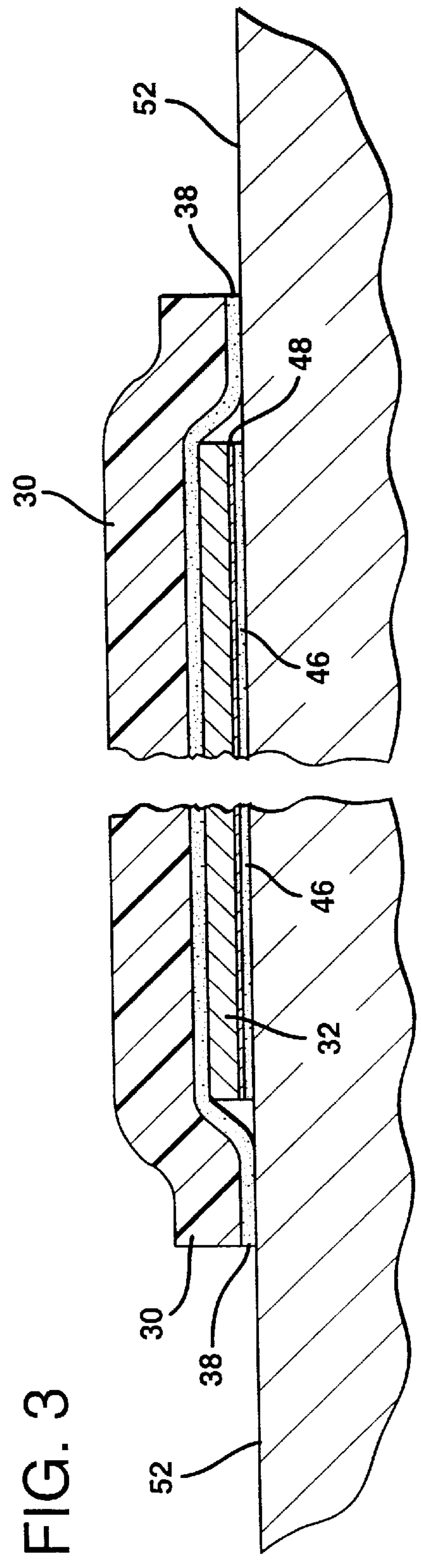
FIG. 3 is a sectional view of the label arrangement of the present invention, with the center portion broken away, after it is applied to a label support surface.

Reference is made to FIGS. 1–3 which collectively illustrate the construction and use of the business form of the present invention. The various layers of materials and plies are not drawn to scale, but are proportioned for illustrative purposes only. As seen in FIG. 1, the business form 10 includes a label assembly 12, which carries printed indicia 14 and a carrier sheet 16 having an upper surface 18 and a lower surface 20. The upper surface of the carrier sheet may also be printed with information related to the label assembly 12 and its use. The carrier sheet 16 defines a die cut opening 22 which extends through the sheet. A patch 24 of liner material is mounted on the lower surface 20 of the carrier sheet 16 such that it extends over the opening 22. The patch 24 of liner material has an upper surface 26 facing the die cut opening 22. The patch of liner material 24 is larger than the die cut opening 22, and is mounted; on the lower surface 20 of the carrier sheet 16 by an adhesive coating 27 that extends around the periphery of the patch.

The central portion of surface 26 carries a layer of a release coating 28 on which the label assembly 12 is mounted. The two ply label assembly 12 has a transparent ply 30, mounted on the upper surface of the patch of liner material 24, and a label ply 32 mounted on the transparent ply 30. The transparent ply 30 has an upper surface 34 and a lower surface 36, and a layer of pressure sensitive adhesive 38 coats at least a portion of the lower surface 36 of the transparent ply 30, adhesively securing the transparent ply 30 to the patch 24. A release coating 40 extends over at least a portion of the upper surface of the transparent ply 30, and it is preferable that the release coating 40 extend over the entire upper portion of the transparent ply 30, since this is easier to accomplish. The label ply 32 has an upper surface 42 and a lower surface 44. A layer of pressure sensitive adhesive 46 coats at least a portion of the lower surface 44 of the label ply 32, adhesively securing the label ply 32 to the transparent ply 30.

As is apparent, the transparent ply 30 is larger than the label ply 32. This serves several purposes. This permits the label ply 32 to be removed from the business form somewhat more easily than would be the case if the transparent ply 30 and the label ply 32 were the same dimensions. Further, as explained more fully below, when the label 32 is placed on a label support surface, the transparent ply 30 is typical placed over the label ply 32, providing protection from the environment. By utilizing a somewhat larger transparent ply, the label 32 is more completely protected.

The label ply 32 may include a layer of tamper evident material 48 on the lower surface 44. The material 48 is such that the removal of the label ply 48 from a label support surface to which it is ultimately applied, a surface not coated with a release coating, will cause this removal to become evident by marking the label ply 32. Examples of such materials are given above.

FIG. 3 illustrates the method by which the invention is used. First, such additional information as may be desired is printed on the upper surface 42 of the label ply 32. For example, if the label ply is ultimately to be affixed to an automobile license plate, a license number and expiration date may be printed on the label ply 32 by any type of printer, such as for example a laser printer. Note that by positioning the two ply label assembly 12 within the die cut opening 22, the surface 42 is generally, although not precisely, coplanar with the upper surface 18 of the carrier sheet. As will be appreciated, this facilitates significantly the operation of the printer. At the same time that the surface 42 of the label ply 32 is printed, the surface 18 of the carrier sheet 16 may also be printed with related information. The label ply 32 is then removed from the transparent ply 30 and secured adhesively to the label support surface 52. Next, the transparent ply 30 is removed from the patch of liner material 24. The transparent ply 30 is adhesively secured to the label support surface 52 over the label ply 32. The transparent ply 30 completely covers the label ply 32, protecting the label ply while permitting the indicia on the label ply 32 to be viewed.

The present invention contemplates a method of making a business form having a two ply label assembly that includes a transparent ply mounted on the upper surface of a patch of liner material, and a label ply mounted on the transparent ply. The method includes the step of die cutting an opening in a piece of carrier material. Next, a patch of liner material is adhesively affixed to the piece of carrier material. The transparent ply is adhesively mounted a on the patch of liner material within the die cut opening. Finally, the label ply is adhesively mounted on a portion of the transparent ply which has a release coating. Preferably, the transparent ply and the label ply are applied in one pass on a label affixing system utilizing two affixing heads.

If desired, the carrier material may initially be in the form of a continuous web of material having a plurality of openings that are die cut there through. A corresponding plurality of label assemblies are then applied to the liner patches within the die cut openings. The web of carrier material is then cut into sheets, each of which includes a label assembly.

The label plies will typically carry pre-printed indicia which do not vary from one label to the next. For example, the label ply 32 shown in FIG. 1 carries the words "License No.___" and "Expires." This information is preferably printed on the upper surface of the label ply prior to mounting the label ply on the transparent ply. This provides a significant advantage over a manufacturing process in which the label ply is applied to the transparent ply before the label ply is printed. A principal advantage of printing the label ply prior to mounting it on the transparent ply is that the scrap associated with the printing make ready process will include only label ply material, and no transparent ply material will be wasted in setting up this printing operation.

It will be appreciated that in the method of the present invention the label ply and the transparent ply are die cut separately, and the label ply is thereafter adhesively mounted on the upper surface of the transparent ply. This is preferable to die cutting the plies after mounting the label ply material on the transparent ply materials. While such a die cutting process is possible, as taught by the previously discussed Avery patent, the method of the present invention provides better quality die cuts of the label ply than can be achieved with the somewhat soft backing provided by the transparent ply.

Having described the present invention in detail and by reference to various embodiments thereof, it will be apparent that certain modifications and variations are possible without departing from the scope of the invention defined in the appended claims.

What is claimed is:

1. A method of making a business form including a label assembly, said method comprising:

a) providing a piece of carrier material having an upper surface and a lower surface, die cutting an opening therethrough, and removing the die cut portion of said material to form a carrier sheet;

b) adhesively mounting a patch of liner material to said lower surface of said carrier sheet such that said liner material extends over said die cut opening, said liner material having an upper surface facing said die cut opening and carrying a release coating on its upper surface;

c) adhesively mounting a transparent ply on said patch of liner material within said die cut opening; and d) adhesively mounting a label ply on said transparent ply.

2. The method of making a business form of claim 1 in which said label ply has an upper surface and a lower surface, and in which the step of mounting said label ply on said transparent ply includes the step of mounting said label ply with said lower surface in contact with said transparent ply, and further comprising the step of printing indicia on said upper surface of said label ply prior to mounting said label ply on said transparent ply.

3. The method of making a business form of claim 1 in which the step of adhesively mounting said label ply on said transparent ply includes the step of mounting said label ply on said transparent ply with a tamper evident layer there between.

4. The method of making a business form of claim 1 in which the step of adhesively mounting said label ply on said transparent ply includes the step of including a release coating over that portion of said transparent ply upon which said label ply is mounted.

* * * * *